United States Patent
Adjedj et al.

(10) Patent No.: US 11,604,857 B2
(45) Date of Patent: Mar. 14, 2023

(54) ANTI CLONING FOR WHITE BOX PROTECTED DATA

(71) Applicant: THALES DIS FRANCE SA, Meudon (FR)

(72) Inventors: Michael Adjedj, Meudon (FR); Aline Gouget, Meudon (FR); Stéphane Grellier, Meudon (FR); Sylvain Leveque, Meudon (FR); Jan Vacek, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 62 days.

(21) Appl. No.: 17/266,930

(22) PCT Filed: Jul. 16, 2019

(86) PCT No.: PCT/EP2019/069097
§ 371 (c)(1),
(2) Date: Feb. 8, 2021

(87) PCT Pub. No.: WO2020/030387
PCT Pub. Date: Feb. 13, 2020

(65) Prior Publication Data
US 2021/0312018 A1     Oct. 7, 2021

(30) Foreign Application Priority Data
Aug. 9, 2018   (EP)  .................................... 18306094

(51) Int. Cl.
*G06F 21/14*     (2013.01)
*G06F 21/53*     (2013.01)
(Continued)

(52) U.S. Cl.
CPC .............. *G06F 21/14* (2013.01); *G06F 21/53* (2013.01); *G06F 21/73* (2013.01); *H04L 9/0866* (2013.01);
(Continued)

(58) Field of Classification Search
CPC .......... G06F 21/14; G06F 21/53; G06F 21/73; G06F 2221/2149; H04L 9/0866; H04L 9/0869; H04L 2209/16
See application file for complete search history.

(56) References Cited

FOREIGN PATENT DOCUMENTS

| EP | 3178690 A1 | 6/2017 | |
| EP | 3179690 A1 * | 6/2017 | ............. G06F 21/14 |
| WO | WO2009/140774 A1 | 11/2009 | |

OTHER PUBLICATIONS

Lionel M Riviere: "Sécurisation des implémentaions logicielles face aux attaques par injection de faute sur systémesembarqués", (Sep. 23, 2015), XP055553945, Paris Retrieved from the Internet: URL:http://lionel.riviere.name/thesis/LionelRivierePhD.pdf [retrieved on Feb. 8, 2019] paragraph [0002]—paragraph [0003].

(Continued)

*Primary Examiner* — Hee K Song
(74) *Attorney, Agent, or Firm* — The Jansson Firm; Pehr B. Jansson

(57) ABSTRACT

Protection of a data file to be used by a white-box cryptography software application installed in memory of a device to prevent the malevolent use of a digital copy of the data file by a white-box cryptography (WBC) software application installed in memory of another device. The mechanism includes extracting an unique identifier for the device from the environment of the device and modifying data in the data file according to the unique identifier, the available white-box cryptography software application includes a software security layer to retrieve the unique identifier from the (Continued)

environment of the device in which the software application is installed and to use this unique identifier in combination with the stored data file when executing, the result of the execution being correct only in case where the correct unique identifier has been extracted by the executed WBC software application.

16 Claims, 1 Drawing Sheet

(51) Int. Cl.
    *G06F 21/73*     (2013.01)
    *H04L 9/08*     (2006.01)

(52) U.S. Cl.
    CPC .... *H04L 9/0869* (2013.01); *G06F 2221/2149* (2013.01); *H04L 2209/16* (2013.01)

(56) References Cited

OTHER PUBLICATIONS

Guillaume Bouffard: "A Generic Approach for Protecting Java Card TM Smart Card Against Software Attacks a Generic Approach for Protecting Java Card". (Oct. 10, 2014), XP055253587, Retrieved from the Internet: URL:https://tel.archives-ouvertes.fr/tel-01089654/document [retrieved on Feb. 26, 2016] paragraphs [0001], [0004], [0007].
Julien Iguchi-Cartigny et al: "Developing a Trojan applets in a smart card", Journal in Computer Virology, vol. 6, No. 4, (Sep. 11, 2009), pp. 343-351, XP055253827, Paris ISSN: 1772-9890, DOI: 10.1007/s11416-009-0135-3 paragraph [0004]—paragraph [0005].
PCT/EP2019/069097, International Search Report, European Patent Office, P.B. 5818 Patentlaan 2 NL—2280 HV Rijswijk.
PCT/EP2019/069097, Written Opinion of the International Searching Authority, European Patent Office, D-80298 Munich.

* cited by examiner

ANTI CLONING FOR WHITE BOX PROTECTED DATA

FIELD OF THE INVENTION

The present invention relates to a method to protect a data file to be used by a white-box cryptography software application installed in memory of a device to prevent the malevolent use of a digital copy of the data file by a white-box cryptography software application installed in memory of another device.

The invention also pertains to a White Box Cryptography software application and to a device implementing said method.

BACKGROUND OF THE INVENTION

The invention concerns the software protection features for mobile application or other software applications related to server security or to Internet of Things devices. In general the invention concerns any software running in an untrusted environment like for instance servers or IoT devices.

The invention deals with a specific software technique known under the name "anti-cloning" or "device binding" or "application Binding". This software protection technique is used to prevent execution of a binary on a non-genuine device. Strictly speaking the binary knows the fingerprints of the execution environment like the MAC address, CPU ID, HDD serial number, instance ID, etc. and verify this integrity during execution. If the fingerprints do not match, the device is seen as "cloned" and the program can react in several ways. This technology can be used to help protecting code lifting. This technic can also be extend on different instances of the same application on the same device, a unique number per instance.

However the classical anti-cloning protection does not prevent the following white-box attack path where the attacker download the legitimate application from an app store on its own device/mobile phone.

The principle of the attack is:
1. To locate the data files containing the white-box protected data, including key and parameters, on a target device of an end-user;
2. To load/copy these data files on the attacker's device/mobile;
3. To run the legitimate application using the copied data files.

Using this simple attack path, the attacker gets the possibility to in fine clone the legitimate cryptographic functionalities, including the ones using keys, without cloning/modifying any code or software, just by using/loading the legitimate application with copied data file.

The technical problem solved by this invention is a software technique that prevent this specific attack path concerning the data files used by a WBC application.

SUMMARY OF THE INVENTION

The present invention aims at avoiding the above-mentioned malicious attacks by making them unsuccessful.

The present invention is defined, in its broadest sense, as a method to protect a data file to be used by a white-box cryptography software application installed in memory of a device to prevent the malevolent use of a digital copy of the data file by a white-box cryptography software application installed in memory of another device, said method comprising the steps of:

extracting an unique identifier for the device from the environment of the device, modifying data in the data file according to the unique identifier, the available white-box cryptography software application being such that it comprises a software security layer adapted to, when the WBC software application is executed, retrieve the unique identifier from the environment of the device in which it is installed and to use this unique identifier in combination with the data file in its execution, the result of the execution being correct only in case where the correct unique identifier has been extracted by the executed WBC software application.

The invention thus consists in providing an additional layer of anti-cloning on data to the classical anti-cloning protections for protecting code. The goal of the invention is to add a new layer of software security at the data level.

According to an advantageous feature, the unique identifier is different from the ones used in other anti-cloning features used in code of the available white-box cryptography software application.

It is indeed important that the additional software security layer of the invention does not weaken the security of the classical anti-cloning protection applied on code. Using the same fingerprint/mobile/device ID for the two techniques could thus constitute a weakness that is avoided with this feature.

According to a specific embodiment, the access to provisioned data contained in data file of the WBC software application is modified depending on the unique identifier.

In this case, the data in the data file are typically encoded using the unique identifier. The data are then decoded before being used by the application. It is here noted that the identifier could go through different types of functions before getting the data.

According to another specific embodiment, the access to provisioned data contained in data file of the WBC software application is direct and the modification of the provisioned data contained in data file occurs only in volatile memory.

In this case, the data are accessed encoded and the decoding occurs in the execution of the application itself.

In an embodiment, the environment of the device is a companion secure environment.

This embodiment enables the unique identifier to be stored and then extracted.

Such a companion secure environment is advantageously chosen among: a secure storage, a secure enclave, a secure keystore, a Secure Element, a Trusted Execution Environment.

In an embodiment of the invention, the unique identifier for the device is a confidential value stored in the environment of the device or a function applied to this confidential value.

This embodiment is adapted in device having a secure environment. It is here noted that the unique identifier can be calculated/generated by the back end server and provisioned by the back end server in a secure way to the environment of the device.

Advantageously, the unique identifier for the device is a MAC address, a CPU ID, a HDD serial number, an application instance ID, another value used in anti-cloning technique or whatever combination of these values.

According to another type of embodiment, the unique identifier for the device is a user data known by user such as PIN, passphrase, answer to questions.

In such a case the invention requires user interaction.

In another embodiment requiring user interaction, the unique identifier for the device is biometric data such as fingerprint, face, voice.

The use of such biometric data enables to check the presence of the user.

According to another type of embodiment, the unique identifier for the device is a secret data coming from another application.

This embodiment implies that a right other application is present in the environment of the device.

According to a specific embodiment, the method comprises a preliminary step of installing a dedicated application to store the unique identifier securely.

According to another kind of embodiment of the invention, the unique identifier for the device is constructed using a random value generated by the environment of the device.

Such an embodiment introduces a randomness in the generation of the unique identifier. However this random value has to be stored in the environment to be retrieved by the instance of the application to be executed. It is here noted that the unique identifier is indeed specific to an instance of the application.

Advantageously, the unique identifier for the device is computed on-the-fly using a combination of values chosen among the ones listed in previous embodiments.

Such an on-the-fly computation enables to have a variety in the constitution of the unique identifier. The composite nature of the unique identifier is here an advantage as several right retrieved values are necessary to rebuild the unique identifier.

According to a preferred embodiment, the modification is chosen among a key based random permutation of data in the data file, typically WBC protected keys, based on the unique identifier, a simple XOR operation with the unique identifier, a PRNG seeded with the unique identifier, an encryption mechanism keyed with the unique identifier.

Such operations on the data file enable the implementation of the anti-cloning additional layer of the invention. When the data file comprises WBC protected keys, the invention is particularly original and useful. In this case the mechanism of the WBC software application being dependent on the WBC protected keys is conceived depending on the invention, taking into account the modification of the WBC protected keys according to the unique identifier.

According to an advantageous implementation, the step of modification of data in the data file according to the unique identifier every time the WBC software application is provisioned with new WBC data in the data file.

This implementation enables to confer a temporary character to the unique identifier. In WBC implementation such a temporary character is an advantage in terms of security.

According to an implementation of the invention, the step of modification of data in the data file according to the unique identifier is performed by the WBC software application installed in the device.

In this case, the data file is locally modified. It enables that the unique identifier remains inside the device.

According to another implementation, the method comprises a step of, for the device, sending the unique identifier or elements as extracted to construct the unique identifier, to a data file provisioning back-end server, the step of modification of data in the data file to be provisioned according to the unique identifier is performed by the back-end server before sending the data file and the method further comprises a step of, for the data file provisioning back-end server, sending the modified data file to the device by a secure channel.

This embodiment enables the data file provisioning back-end server to have full control of the provision and treatment of data.

According to a last advantageous implementation, the WBC software application is such that it uses a combination of data modified using at least two unique identifiers of the device, one, named back-end calculated unique identifier, being constructed by the data file provisioning back-end server and one, named device calculated unique identifier, being constructed by the WBC software application, combined operations consecutively performed by the data file provisioning back-end server and by the device using back-end and device calculated unique identifiers respectively corresponding to the operation performed by the device during the running time using combined back-end and device calculated unique identifier.

This implementation is advantageous as it makes a mixed usage of unique identifiers, one being calculated locally in the device and the other being calculated based on information retrieved from the device to the data file provisioning back-end server.

The invention also concerns a White Box Cryptography software application comprising a code anti-cloning feature to be activated when the WBC software application is installed on a device having an environment, said WBC software application further comprising a data anti-cloning feature to be activated at each WBC data provisioning in a data file, said data anti-cloning feature being adapted to, each time a WBC data provisioning is triggered, retrieve a unique identifier from the environment of the device, modifying the provisioned data using the unique identifier before storage of the data file, said WBC software application being adapted to, when it is executed, extract the unique identifier from the environment of the device in which it is installed and to use this unique identifier in combination with the stored WBC data in the data file in its execution, the result of the execution being correct only in case where the correct unique identifier has been extracted by the executed WBC software application.

Such an application is autonomously able to protect the data file as received from a data file provisioning back-end server.

In another implementation, the invention concerns a White Box Cryptography software application comprising a code anti-cloning feature to be activated when the WBC software application is installed on a device having an environment, said WBC software application further comprising a data anti-cloning feature to be activated at each WBC data provisioning in a data file, said data anti-cloning feature being adapted to, each time a WBC data provisioning is triggered, retrieve a unique identifier from the environment of the device, sending said unique identifier to a back-end provisioning server for it to modify data to be provisioned in the data file using said unique identifier, receiving and storing the provisioned modified data in the data file, said WBC software application being adapted to, when it is executed, extract the unique identifier from the environment of the device in which it is installed and to use this unique identifier in combination with the stored WBC data in the data file in its execution, the result of the execution being correct only in case where the correct unique identifier has been extracted by the executed WBC software application.

This implementation implies the back-end to be implicated in the construction of the modified data file.

The invention also relates to a device having an environment and comprising a memory where a White Box Cryptography software application comprising a code anti-cloning feature to be activated when the WBC software application is installed, said WBC software application further comprising a data anti-cloning feature to be activated at each WBC data provisioning in a data file, said data anti-cloning feature being adapted to, each time a WBC data provisioning is triggered, retrieve a unique identifier from the environment of the device, modifying the provisioned data in the data file using the unique identifier before storage, said WBC software application being adapted to, when it is then executed, extract the unique identifier from the environment of the device in which it is installed and to use this unique identifier in combination with the stored WBC data in the data file in its execution, the result of the execution being correct only in case where the correct unique identifier has been extracted by the executed WBC software application.

The invention also relates to another embodiment of a device, this device having an environment and comprising a memory where a White Box Cryptography software application comprising a code anti-cloning feature to be activated when the WBC software application is installed, said WBC software application further comprising a data anti-cloning feature to be activated at each WBC data provisioning in a data file, said data anti-cloning feature being adapted to, each time a WBC data provisioning is triggered, retrieve a unique identifier from the environment of the device, sending said unique identifier to a data file back-end provisioning server for it to modify data to be provisioned in the data file using said unique identifier, receiving and storing the provisioned modified data in the data file, said WBC software application being adapted to, when it is executed, extract the unique identifier from the environment of the device in which it is installed and to use this unique identifier in combination with the stored WBC data in the data file in its execution, the result of the execution being correct only in case where the correct unique identifier has been extracted by the executed WBC software application.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed.

Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
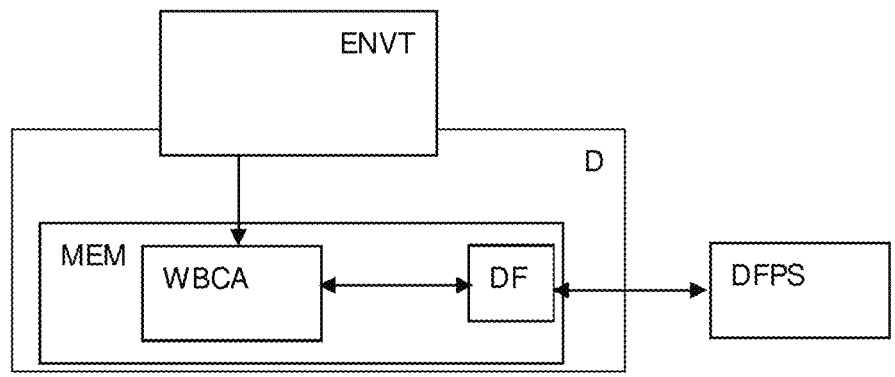
FIG. 1 represents a device where the present invention is advantageously implemented.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows a device D of the type where the invention is advantageously implemented. Such a device D is related to an environment ENVT. The device comprises at least a memory MEM where a white box cryptography (WBC) application WBCA is installed. The memory MEM also stores at least one data file DF to be used during the execution of the WBC application WBCA.

Figure 2:
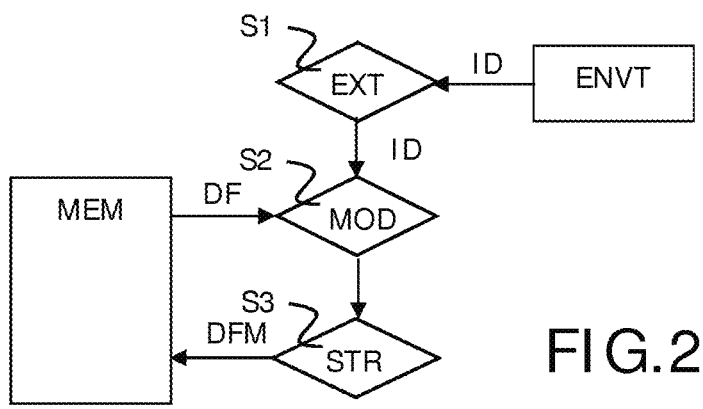
FIG. 2 shows schematically a flowchart of the method of the invention.

FIG. 2 shows schematically a flowchart of the method of the invention. In a step S1, an unique identifier ID is extracted from the environment ENVT of the device D. In a step S2, the data file DF as stored in memory MEM is modified and, in a step S3, is stored as a modified data file DFM in memory MEM.

Depending on the entity that performs the modification of the data, several implementations of the set-up phase of the invention are possible.

In a first mode of this set-up phase, the data modification/re-ordering is done by the software application. In this mode, the WBC software application is loaded onto the device, typically from an applications' store.

The anti-cloning feature for data protection is then initialized. In a first case, a random value is generated in the environment of the device, for example in the companion secure environment. Then, the unique identifier ID is constructed. In a second case, the construction of the unique identifier ID depends on a combination of values where the end-user may be involved or not.

In step S2, data contained in data files are modified by the WBC software application itself either to make the access to data dependent on the unique identifier ID or using the inverse function of the selected function and the unique identifier ID.

In an advantageous option, every time the software application is provisioned with new white-box protected data or keys, the received data/key are modified/re-ordered by the software application itself.

In a second mode of the set-up phase, the data modification/re-ordering is done by the back-end. In this mode too, the WBC software application is loaded onto the device, for example from an applications' store.

Then the anti-cloning feature for data protection is initialized according to the same cases than in the first mode with a random value or depending on a combination of values. Here however, the random value or values of the combination are collected and transmitted to a data file provisioning back-end server DFPS by a secure channel.

In this second mode, the unique identifier ID is computed by the data file provisioning back-end server DFPS. Thus device specific data, typically containing secret key of the WBC computation, are generated by the data file provisioning back-end server DFPS using the unique identifier ID. At last, the device specific data are transmitted to the device by a secure channel.

A third mode of the set-up phase is a combination of the first and second modes. In this third mode, the WBC software application is loaded onto the device, for example from an applications' store. A first phase of the anti-cloning feature for data protection is initialized according one of the two cases presented above, using a generated random value or a combination of values.

The following steps of the second mode are then performed. Data, or a value generated from the data, to be used in the computation of the unique identifier ID are collected and transmitted to the data file provisioning back-end server DFPS by a secure channel. Then a first unique identifier ID_1 is computed by the data file provisioning back-end server DFPS.

Then device specific data, typically containing secret key useful for the computation in the WBC software application, are generated by the data file provisioning back-end server DFPS using the first unique identifier ID_1.

These device specific data are then transmitted to the device by a secure channel.

Two steps of the first mode of set-up phase are then performed in a second phase of the anti-cloning feature for data protection is initialized. Again, the two above mentioned cases, use of a random value extracted from the environment and use of a combination of values, can be implemented. A second unique identifier ID_2 is thus accordingly generated or constructed.

Then data contained in data files are modified by the application itself either to make the access to data dependent on the second unique identifier ID_2 or using the inverse function of the selected function to modify the data and second unique identifier ID_2.

Combined operations consecutively performed by the data file provisioning back-end server DFPS and by the device using the two values of the first unique identifier ID_1 and of the unique identifier ID_2 respectively has to correspond to the operations performed by the device during the running time using combined first and second unique identifiers ID_1 and ID_2, both retrieved from the environment of the device. In this third mode, the two values of the first and second unique identifiers ID_1 and ID_2 are locally generated or computed. It is thus necessary for the WBC software application to be adapted to compute them or to integrate all computation enabling to use the locally retrieved data in order to obtain the right WBC computation when right locally retrieved data are applied in the computation.

Figure 3:
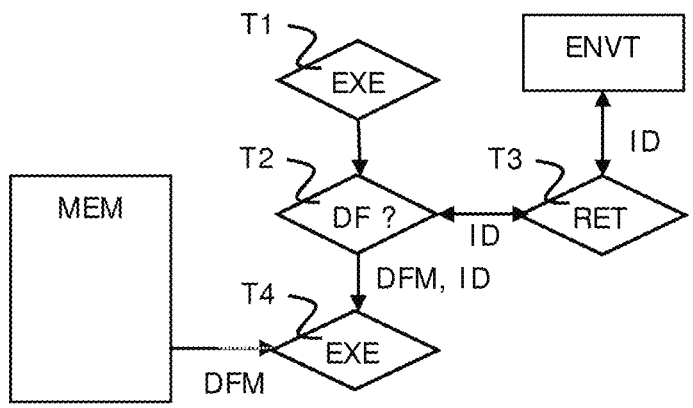
FIG. 3 shows schematically a flowchart of the execution of a white box cryptography software application.

FIG. 3 schematically shows the execution of the WBC application WBCA according to the invention at running time, assuming that the set-up phase is already done. In the run of the execution T1 of the application WBCA, data file DF is schematically shown as being needed in a step T2. This step triggers a step T3 of retrieval of the unique identifier ID in the environment ENVT.

A unique identifier ID can be locally retrieved by the device. This unique identifier ID can be retrieved from a companion secure environment, e.g. secure storage, secure enclave or keystore techniques, SE, TEE, etc., retrieved as a confidential value provided by a secure storage or other secure environment when the software application is executed. The value of the unique identified ID can be equal to this confidential value or a function can be applied on this confidential value to get the unique identified ID.

The unique identifier can also be computed on-the-fly using a combination of values, which may include MAC address, CPU ID, HDD serial number, application instance ID or other values used in standard anti-cloning technique, user data known by user like PIN, passphrase, questions, biometric data: fingerprint, face, voice, data provided by a secure environment, e.g. by a secure storage, a secure enclave or a keystore, a secret data coming from another application. In this last case, during provisioning, another application is installed to store securely a unique identified ID.

Once the unique identifier ID is retrieved, the execution is pursued as schematically shown by a step T4 where the modified data file DFM is read in the memory MEM. The access to data contained in data file DF of the software application is either modified depending on the unique identifier ID or the access to data files DF is regular and the modification/re-ordering occurs only in volatile memory during the execution. The modification/re-ordering is based on both a dedicated function and the unique identifier ID.

Depending on the type of implementation, different types of modifications can be applied.

In the case of functions for generic white-box implementation, the modification can be a permutation of white-box protected keys based on the unique identifier ID and typically a Key Based Random Permutation. Specifically some white-box protected key values are permutated according to the Key Based Random permutation and the unique identifier ID as parameter.

For such function for generic WBC implementation, the modification can also be a simple XOR operation with the unique identified ID or a function applied on the unique identifier ID such as a pseudo random number generator (PRNG) seeded with the unique identifier ID or another classical encryption mechanism keyed with the unique identifier ID applied on white-box protected data including key. More generally, any function can be applied to the unique identifier ID performing a XOR operation with the white-box protected data.

For functions for table-based WBC implementation, the modification can be a permutation of tables based on the unique identifier ID and a Key Based Random Permutation. Typically the first layers of tables are modified using the Key Based Random permutation and the unique identifier ID as parameter.

The operation can also be a simple XOR operation with a PRNG seeded with the unique identifier ID or another classical encryption mechanism keyed with the unique identifier ID. The modification can also be a removal of external anti-cloning encodings based on the unique identifier ID and a generator of external encoding for anti-cloning feature.

Then the White-box cryptography function is executed and the result of the execution is correct only if a right unique identifier ID was retrieved at step T3. Otherwise, the output of the white-box crypto function will be wrong.

The advantages of the invention is to add a new layer of anti-cloning or binding at the white-box cryptography level. This prevents some attack paths like copy-paste white-box protected keys from one application to another application.

In the above detailed description, reference is made to the accompanying drawings that show, by way of illustration, specific embodiments in which the invention may be practiced. These embodiments are described in sufficient detail to enable those skilled in the art to practice the invention.

It is to be understood that the various embodiments of the invention, although different, are not necessarily mutually exclusive. For example, a particular feature, structure, or characteristic described herein in connection with one embodiment may be implemented within other embodiments without departing from the scope of the invention.

The invention claimed is:

1. A method to protect a data file to be used by a White-Box Cryptography (WBC) software application installed in memory of a device to prevent the malevolent use of a digital copy of the data file by a white-box cryptography software application installed in memory of another device, said method comprising the steps of:

extracting an unique identifier for the device from an environment related to the device modifying data in the data file according to the unique identifier, when the WBC software application is executed, retrieving the unique identifier from the environment of the device in which the WBC software application is installed, and using this unique identifier in combination with the stored data file in the execution of the WBC software application, the result of the execution being correct only when a unique identifier extracted by the WBC software application when executing correctly matches the unique identifier used in modifying data in the data file.

2. The method according to claim 1, wherein the unique identifier is different from the ones used in other anti-cloning features used in code of the available white-box cryptography software application.

3. The method according to claim 1, wherein the access to provisioned data contained in data file of the WBC software application is modified depending on the unique identifier.

4. The method according to claim 1, wherein the access to provisioned data contained in data file of the WBC software application is direct and the modification of the provisioned data contained in data file occurs only in volatile memory.

5. The method according to claim 1, wherein the environment of the device is a companion secure environment.

6. The method according to claim 1, wherein the unique identifier for the device is constructed using a random value generated by the environment of the device.

7. The method according to claim 1, wherein the unique identifier for the device is computed on-the-fly using a combination of values chosen among: a confidential value stored in the environment of the device or a function applied to this confidential value, a MAC address, a CPU ID, a HDD serial number, an application instance ID or another value used in anti-cloning technique, a user data known by user such as PIN, passphrase, answer to questions, biometric data selected from fingerprint, face, voice, and a secret data coming from another application.

8. The method according to claim 1, wherein the modification is chosen among a key based random permutation of data in the data file based on the unique identifier, a XOR operation with the unique identifier, a Pseudo Random Number Generation seeded with the unique identifier, an encryption mechanism keyed with the unique identifier.

9. The method according to claim 1, wherein the step of modification of data in the data file according to the unique identifier every time the WBC software application is provisioned with new WBC data in the data file.

10. The method according to claim 1, wherein the step of modification of data in the data file according to the unique identifier is performed by the WBC software application installed in the device.

11. The method according to claim 1, said method comprising a step of, for the device, sending, in a secure channel, the unique identifier or elements as extracted to construct the unique identifier, to a data file provisioning back-end server, the step of modification of data in the data file to be provisioned according to the unique identifier is performed by the back-end server before sending the data file and the method further comprises a step of, for the data file provisioning back-end server, sending the modified data file to the device in a secure channel.

12. The method according to claim 1, wherein the WBC software application uses a combination of data modified using at least two unique identifiers of the device, one, named back-end calculated unique identifier, being constructed by a data file provisioning back-end server and one, named device calculated unique identifier, being constructed by the WBC software application, combined operations consecutively performed by the data file provisioning back-end server and by the device using back-end and device calculated unique identifiers respectively corresponding to the operation performed by the device during the running time using combined back-end and device calculated unique identifier.

13. A non-transitory memory containing a White Box Cryptography (WBC) software application comprising a code anti-cloning feature to be activated when the WBC software application is installed on a device having an environment, said WBC software application further comprising a data anti-cloning feature to be activated at each WBC data provisioning in a data file, said data anti-cloning feature being adapted to, each time a WBC data provisioning is triggered, retrieve a unique identifier from the environment of the device, modifying the provisioned data using the unique identifier before storage of the data file, said WBC software application being adapted to, when it is executed, extract the unique identifier from the environment of the device in which it is installed and to use this unique identifier in combination with the stored WBC data in the data file in its execution, the result of the execution being correct only when a unique identifier extracted by the WBC software application when executing correctly matches the unique identifier used in modifying data in the data file.

14. A non-transitory memory containing a White Box Cryptography software application comprising a code anti-cloning feature to be activated when the WBC software application is installed on a device having an environment, said WBC software application further comprising a data anti-cloning feature to be activated at each WBC data provisioning in a data file, said data anti-cloning feature being adapted to, each time a WBC data provisioning is triggered, retrieve a unique identifier from the environment of the device sending said unique identifier to a data file back-end provisioning server for it to modify data to be provisioned in the data file using said unique identifier, receiving and storing the provisioned modified data in the data file, said WBC software application being adapted to, when it is executed, extract the unique identifier from the environment of the device in which it is installed and to use this unique identifier in combination with the stored WBC data in the data file in its execution, the result of the execution being correct only in case where the correct unique identifier has been extracted by the executed WBC software application.

15. A device having an environment and comprising a non-transitory memory where a White Box Cryptography software application comprising a code anti-cloning feature to be activated when the WBC software application is installed, said WBC software application further comprising a data anti-cloning feature to be activated at each WBC data provisioning in a data file, said data anti-cloning feature being adapted to, each time a WBC data provisioning is triggered, retrieve a unique identifier from the environment of the device, modifying the provisioned data in the data file using the unique identifier before storage, said WBC software application being adapted to, when it is then executed, extract the unique identifier from the environment of the device in which it is installed and to use this unique identifier in combination with the stored WBC data in the data file in its execution, the result of the execution being correct only in case where the correct unique identifier has been extracted by the executed WBC software application.

16. The device having an environment and comprising a non-transitory memory where a White Box Cryptography software application comprising a code anti-cloning feature to be activated when the WBC software application is installed, said WBC software application further comprising a data anti-cloning feature to be activated at each WBC data provisioning in a data file, said data anti-cloning feature being adapted to, each time a WBC data provisioning is triggered, retrieve a unique identifier from the environment of the device sending said unique identifier to a data file back-end provisioning device for it to modify data to be provisioned in the data file using said unique identifier, receiving and storing the provisioned modified data in the data file, said WBC software application being adapted to, when it is executed, extract the unique identifier from the environment of the device in which it is installed and to use this unique identifier in combination with the stored WBC data in the data file in its execution, the result of the execution being correct only in case where the correct unique identifier has been extracted by the executed WBC software application.

* * * * *